United States Patent
Mashio et al.

(10) Patent No.: US 10,573,421 B2
(45) Date of Patent: Feb. 25, 2020

(54) PLANT OPERATION SYSTEM AND PLANT OPERATION METHOD

(71) Applicant: MITSUBISHI HEAVY INDUSTRIES, LTD., Tokyo (JP)

(72) Inventors: Kenji Mashio, Tokyo (JP); Takae Yamashita, Tokyo (JP); Takashi Azuma, Tokyo (JP); Susumu Shiizuka, Tokyo (JP); Junichi Nishitani, Tokyo (JP); Masafumi Utsumi, Tokyo (JP); Jun Shibuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 123 days.

(21) Appl. No.: 15/736,547

(22) PCT Filed: Jun. 22, 2016

(86) PCT No.: PCT/JP2016/068567
§ 371 (c)(1),
(2) Date: Dec. 14, 2017

(87) PCT Pub. No.: WO2017/051576
PCT Pub. Date: Mar. 30, 2017

(65) Prior Publication Data
US 2018/0190403 A1 Jul. 5, 2018

(30) Foreign Application Priority Data
Sep. 25, 2015 (JP) .................. 2015-188601

(51) Int. Cl.
*G06F 19/00* (2018.01)
*G21D 3/06* (2006.01)
(Continued)

(52) U.S. Cl.
CPC ............. *G21D 3/06* (2013.01); *G05B 19/058* (2013.01); *G21C 9/00* (2013.01); *G21C 17/00* (2013.01); *G05B 2219/161* (2013.01)

(58) Field of Classification Search
CPC .... G21D 3/06; G05B 23/0283; G05B 19/058; G05B 2219/24019; G05B 2219/32226;
(Continued)

(56) References Cited

U.S. PATENT DOCUMENTS 5,311,562 A * 5/1994 Palusamy .......... G05B 23/0283
376/215
5,533,413 A * 7/1996 Kobayashi ............... G07C 3/00
73/865.9
(Continued)

FOREIGN PATENT DOCUMENTS

EP        0 626 697 A1    11/1994
JP        2001-093067 A    4/2001
(Continued)

OTHER PUBLICATIONS

Extended (Supplementary) European Search Report dated Jul. 10, 2018, issued in counterpart application No. 16848366.7. (7 pages).
(Continued)

*Primary Examiner* — Michael D Masinick
(74) *Attorney, Agent, or Firm* — Westerman, Hattori, Daniels & Adrian, LLP

(57) ABSTRACT

An atomic power plant operation system for assisting the operation of an atomic power generation plant is provided with: an operation monitoring system which monitors and controls the operation of the atomic power generation plant; an abnormality indication monitoring system which, on the basis of an operation history of the atomic power generation plant, monitors an indication of abnormality in the atomic power generation plant; an abnormality diagnosis system
(Continued)

| | | MEASUREMENT PARAMETER B | |
|---|---|---|---|
| | MEASUREMENT PARAMETER A | | |
| ABNORMALITY MODEL PATTERN PA | | ABNORMALITY CAUSE CA1 | OCCURRENCE PROBABILITY OA1 |
| | | ABNORMALITY CAUSE CA2 | OCCURRENCE PROBABILITY OA2 |
| | | ⋮ | ⋮ |
| ABNORMALITY MODEL PATTERN PB | | ABNORMALITY CAUSE CB1 | OCCURRENCE PROBABILITY OB1 |
| | | ABNORMALITY CAUSE CB2 | OCCURRENCE PROBABILITY OB2 |
| | | ⋮ | ⋮ |
| ⋮ | ⋮ | ⋮ | ⋮ | which, on the basis of a result of abnormality indication that has been detected, makes an abnormality diagnosis for the atomic power generation plant; and a maintenance system for performing maintenance and management of the atomic power generation plant, wherein the systems are communicably connected, and the abnormality diagnosis system provides the maintenance system with the result of the abnormality diagnosis of the atomic power generation plant.

4 Claims, 4 Drawing Sheets

(51) Int. Cl.
G21C 17/00 (2006.01)
G05B 19/05 (2006.01)
G21C 9/00 (2006.01)

(58) Field of Classification Search
CPC .... G05B 2219/161; G21C 9/00; G21C 17/00; Y02P 90/14
See application file for complete search history.

(56) References Cited

U.S. PATENT DOCUMENTS

| | | | | |
|---|---|---|---|---|
| 5,623,109 A * | 4/1997 | Uchida | ............. | G05B 23/0254 73/865.9 |
| 7,743,005 B2 * | 6/2010 | Vatchkov | ................. | E02F 9/26 706/16 |
| 7,774,187 B2 * | 8/2010 | Izumi | ..................... | G21C 17/00 703/18 |
| 2004/0220778 A1 * | 11/2004 | Imai | ..................... | G05B 23/027 702/188 |
| 2013/0282336 A1 * | 10/2013 | Maeda | ............... | G05B 23/0229 702/184 |

FOREIGN PATENT DOCUMENTS

| | | |
|---|---|---|
| JP | 2002-155708 A | 5/2002 |
| JP | 2012-137934 A | 7/2012 |
| WO | 02/099550 A1 | 12/2002 |

OTHER PUBLICATIONS

Written Opinion dated Aug. 30, 2016, issued in counterpart Application No. PCT/JP2016/068567, with English Translation (14 pages).
International Search Report dated Aug. 30, 2016, issued in counterpart International Application No. PCT/JP2016/068567, with English translation (5 pages).
Office Action dated May 29, 2019, issued in counterpart EP Application No. 16 848 366.7 (5 pages).

* cited by examiner

FIG. 3

| | | MEASUREMENT PARAMETER B | | |
|---|---|---|---|---|
| | | MEASUREMENT PARAMETER A | | |
| ABNORMALITY MODEL PATTERN PA | ⎿⌒ | ABNORMALITY CAUSE CA1 | OCCURRENCE PROBABILITY OA1 | |
| | | ABNORMALITY CAUSE CA2 | OCCURRENCE PROBABILITY OA2 | |
| | | ⋮ | ⋮ | |
| ABNORMALITY MODEL PATTERN PB | ⌒⎿ | ABNORMALITY CAUSE CB1 | OCCURRENCE PROBABILITY OB1 | |
| | | ABNORMALITY CAUSE CB2 | OCCURRENCE PROBABILITY OB2 | |
| | | ⋮ | ⋮ | |
| ⋮ | ⋮ | ⋮ | ⋮ | |

PLANT OPERATION SYSTEM AND PLANT OPERATION METHOD

TECHNICAL FIELD

The present invention relates to a plant operation system for supporting the operation of a plant and a plant operation method of supporting the operation of a plant.

BACKGROUND ART

An abnormality detection and diagnosis system which detects abnormality or an indication of abnormality in a facility such as a plant and diagnoses the facility is described in the related art (refer to, for example, PTL 1). This system is provided with a database unit storing information on a maintenance history of a plant or a facility and outputs a work instruction relating to necessary maintenance with respect to the occurred abnormality or abnormality indication by linking abnormality detection information detected by a sensor provided in the facility with the information on the maintenance history.

CITATION LIST

Patent Literature

[PTL 1] Japanese Unexamined Patent Application Publication No. 2012-137934

SUMMARY OF INVENTION

Technical Problem

However, in the system of PTL 1, there is a case where even if the occurred abnormalities are different types of abnormalities, the abnormality detection information which is obtained is similar, and in this case, it is thought that it is difficult to output an appropriate work instruction for the occurred abnormality.

Therefore, the present invention has an object to provide a plant operation system and a plant operation method in which it is possible to perform a diagnosis of abnormality of the plant and promptly provide a maintenance system with the result of the abnormality diagnosis.

Solution to Problem

A plant operation system according to the present invention is a plant operation system for supporting operation of a plant, the system including: an operation monitoring system which monitors the operation of the plant and controls the operation of the plant; an abnormality indication monitoring system which monitors an indication of abnormality of the plant, based on an operation history of the plant which is monitored in the operation monitoring system; an abnormality diagnosis system which performs a diagnosis of abnormality of the plant, based on a result of the abnormality indication which is detected by the abnormality indication monitoring system; and a maintenance system which is used for performing maintenance and management of the plant, in which the operation monitoring system, the abnormality indication monitoring system, and the abnormality diagnosis system are connected to one another so as to be able to communicate from the operation monitoring system to the abnormality indication monitoring system and the abnormality diagnosis system, the abnormality diagnosis system and the maintenance system are connected to each other so as to be able to communicate with each other, and the abnormality diagnosis system provides the maintenance system with a result of the diagnosis of abnormality of the plant.

Further, a plant operation method according to the present invention is a plant operation method of supporting operation of a plant, the method including: an operation monitoring step of monitoring the operation of the plant and controlling the operation of the plant; an abnormality indication monitoring step of monitoring an indication of abnormality of the plant, based on an operation history of the plant which is monitored in the operation monitoring step; an abnormality diagnosis step of performing a diagnosis of abnormality of the plant, based on a result of the abnormality indication which is detected in the abnormality indication monitoring step; and a maintenance step of performing maintenance and management of the plant, in which the result of the diagnosis of abnormality of the plant obtained in the abnormality diagnosis step is referred to in the maintenance step.

According to this configuration, the maintenance system can instruct a maintenance worker to perform the maintenance and management of the plant based on the provided result of the abnormality diagnosis, or can provide the maintenance worker with information on the abnormality diagnosis.

Further, it is preferable that the maintenance system has a maintenance terminal which acquires the result of the abnormality diagnosis from the abnormality diagnosis system, and a maintenance mobile terminal which can perform wireless communication with the maintenance terminal, and the maintenance terminal provides the result of the abnormality diagnosis toward the maintenance mobile terminal.

According to this configuration, it is possible to provide the maintenance worker who carries the maintenance mobile terminal with the result of the abnormality diagnosis.

Further, it is preferable that the maintenance terminal and the maintenance mobile terminal are provided in a building in which the plant is installed.

According to this configuration, it is possible to enhance the security concerning the communication between the maintenance terminal and the maintenance mobile terminal.

BRIEF DESCRIPTION OF DRAWINGS

FIG. 3 is an explanatory diagram showing an abnormality model pattern of the measurement parameter, and an abnormality cause corresponding to the abnormality model pattern.

DESCRIPTION OF EMBODIMENTS

Hereinafter, an embodiment relating to the present invention will be described in detail based on the drawings. The present invention is not limited by this embodiment. Further, constituent elements which can be easily replaced by those skilled in the art or constituent elements which are substantially equal to the constituent elements are included in constituent elements in the following embodiment. Further, the constituent elements described below can be appropriately combined with each other, and in a case where there are a plurality of embodiments, it is also possible to combine the respective embodiments.

EMBODIMENT

Figure 1:
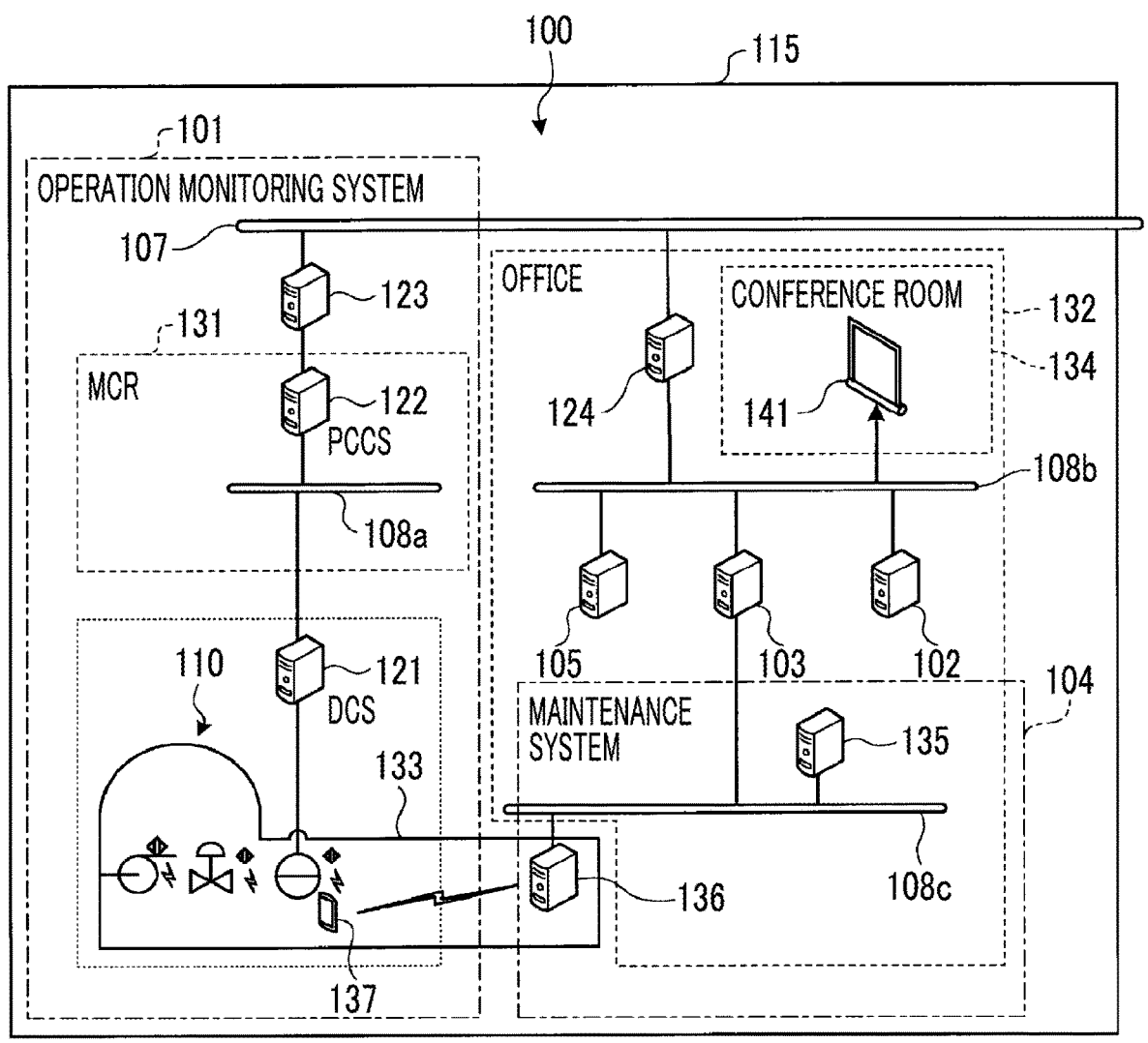
FIG. 1 is a schematic configuration diagram relating to an atomic power plant operation system according to an embodiment.

FIG. 1 is a schematic configuration diagram relating to an atomic power plant operation system according to this embodiment. An atomic power plant operation system 100 is a system for supporting the operation of an atomic power plant. As shown in FIG. 1, the atomic power plant is, for example, an atomic power generation plant 110 having an atomic reactor, and the atomic power generation plant 110 is controlled so as to perform base load operation and provided in a site 115. The atomic power plant operation system 100 will be described with reference to FIG. 1. In this embodiment, the atomic power plant operation system 100 will be described as being applied to the atomic power generation plant 110 as a plant. However, there is no limitation to this configuration, and it may be applied to plants (for example, a chemical plant, a thermal power generation plant, or the like) other than the atomic power plant.

As shown in FIG. 1, the atomic power plant operation system 100 is provided with an operation monitoring system 101, an abnormality indication monitoring system 102, an abnormality diagnosis system 103, a maintenance system 104, and an operation history database 105. Further, in the atomic power plant operation system 100, the respective systems 101, 102, 103, and 104 and the operation history database 105 are communicably connected to each other by a station bus 107 and a plurality of unit buses 108a, 108b, and 108c.

The operation monitoring system 101 monitors and controls the operation of the atomic power generation plant 110. The operation monitoring system 101 is provided with a distributed control system (DCS) 121, a process control system (PCCS: Process Control Computer System) 122, and a gateway 123.

The distributed control system 121 is configured to include a plurality of control devices which are connected so as to be able to control the atomic power generation plant 110 and in which a plurality of control functions are distributed. The distributed control system 121 is a system for controlling the operations of the respective devices such as pumps and valves (not shown) provided in the atomic power generation plant 110. The distributed control system 121 controls the operation of the atomic power generation plant 110 by controlling the operation of each device, based on a control signal from the process control system 122. Further, the distributed control system 121 is connected to a plurality of measuring instruments which are provided in the atomic power generation plant 110, acquires a plurality of measurement parameters which are respectively output from the plurality of measuring instruments, as plant operation data, and outputs the acquired plant operation data toward the process control system 122.

The process control system 122 is connected to the distributed control system 121 through the unit bus 108a and provided in a central control room (MCR: Main Control Room) 131 distant from a building 133 in which the atomic power generation plant 110 is provided. The process control system 122 acquires the plant operation data which is input from the distributed control system 121, and outputs a control signal for controlling the operation of the atomic power generation plant 110 toward the distributed control system 121. Further, the process control system 122 outputs the plant operation data acquired from the distributed control system 121 toward the operation history database 105 through the gateway 123 and the station bus 107.

The gateway 123 is provided between the process control system 122 and the station bus 107 and connected to each of the process control system 122 and the station bus 107. The gateway 123 allows output of the plant operation data from the process control system 122 while restricting input of data from another system to the process control system 122.

The operation monitoring system 101 acquires the plant operation data from the atomic power generation plant 110 and monitors the acquired plant operation data. Further, the operation monitoring system 101 causes the atomic power generation plant 110 to perform base load operation such that a plurality of measurement parameters which are included in the acquired plant operation data reach a predefined target value. In this manner, the atomic power generation plant 110 performs the base load operation, and therefore, the target value becomes a steady-state value.

The operation history database 105 is connected to the station bus 107 through the unit bus 108b and a gateway 124. That is, the gateway 124 is provided between the unit bus 108b and the station bus 107 and connected to each of the unit bus 108b and the station bus 107, and the operation history database 105 is connected to the unit bus 108b. The operation history database 105 is provided in an office 132 distant from the building 133 in which the atomic power generation plant 110 is provided. The operation history database 105 stores the history of the plant operation data by accumulating the plant operation data output from the distributed control system 121. The operation history database 105 can output the plant operation data in response to a request from the abnormality diagnosis system 103 and the maintenance system 104.

The abnormality indication monitoring system 102 is connected to the unit bus 108b and can acquire the plant operation data output from the operation history database 105, through the unit bus 108b. Further, the abnormality indication monitoring system 102 can acquire the plant operation data output from the distributed control system 121 in real time. The abnormality indication monitoring system 102 compares a normal range which is set based on the past plant operation data stored in the operation history database 105 with the current plant operation data acquired in real time, and detects an abnormality indication of the atomic power generation plant 110 in a case where the plant operation data exceeds the normal range. Further, the abnormality indication monitoring system 102 is connected to the unit bus 108b and can output abnormality sign data, which is data relating to the detected abnormality indication, toward the abnormality diagnosis system 103.

The abnormality diagnosis system 103 is connected to the unit bus 108b and can acquire the abnormality sign data output from the abnormality indication monitoring system 102, through the unit bus 108b. The abnormality diagnosis system 103 specifies a facility or a device which causes abnormality, among various facilities and various devices configuring the atomic power generation plant 110, based on the abnormality sign data. Further, the abnormality diagnosis system 103 is connected to the unit bus 108c and can output a diagnostic result relating to the specified facility or device, as maintenance data, toward the maintenance system 104.

The maintenance system 104 is a system for maintaining and managing the atomic power generation plant 110. The maintenance system 104 acquires the maintenance data of the atomic power generation plant 110 diagnosed by the abnormality diagnosis system 103 and provides a maintenance worker with the acquired maintenance data or acquires and accumulates a maintenance inspection result which is obtained by inspection work or the like by the maintenance worker, as the maintenance data. The maintenance system 104 is provided with a maintenance database 135, a maintenance terminal 136, and a maintenance mobile terminal 137.

The maintenance database 135 is provided in the office 132 and connected to the unit bus 108c. The maintenance database 135 outputs the maintenance data to the abnormality diagnosis system 103, accumulates the maintenance data which is input from the maintenance terminal 136 and the maintenance mobile terminal 137, or outputs the maintenance data acquired from the abnormality diagnosis system 103 to the maintenance terminal 136.

The maintenance terminal 136 is provided in the building 133 which is a non-managed area where the atomic power generation plant 110 is provided, and is connected to the unit bus 108c. The maintenance terminal 136 provides the maintenance worker with the maintenance data acquired from the maintenance database 135 or outputs the maintenance data input by the maintenance worker to the maintenance database 135. The maintenance terminal 136 may be provided in the office 132.

The maintenance mobile terminal 137 is carried by the maintenance worker and can perform wireless communication with the maintenance terminal 136. The maintenance inspection result which is obtained by inspection work, visual inspection, or the like by the maintenance worker is input as the maintenance data to the maintenance mobile terminal 137 by the maintenance worker. Further, the maintenance mobile terminal 137 outputs the input maintenance data toward the maintenance terminal 136 by wireless communication. At this time, the maintenance terminal 136 and the maintenance mobile terminal 137 are provided in the building 133, and the wireless communication between the maintenance terminal 136 and the maintenance mobile terminal 137 is performed in the building 133.

In this manner, in the atomic power plant operation system 100, the respective systems 101, 102, 103, and 104 and the operation history database 105 are connected by the respective buses 107, 108a, 108b, and 108c, and therefore, it is possible to share various kinds of data obtained by the respective systems 101, 102, 103, and 104 and process the shared various kinds of data.

Further, in the atomic power plant operation system 100, a large information terminal 141 is provided in a conference room 134 in the office 132, and the large information terminal 141 is connected to the unit bus 108b. In addition to the maintenance data accumulated in the maintenance system 104, the data acquired in each of the systems 101, 102, and 103 can be displayed on the large information terminal 141.

Figure 2:
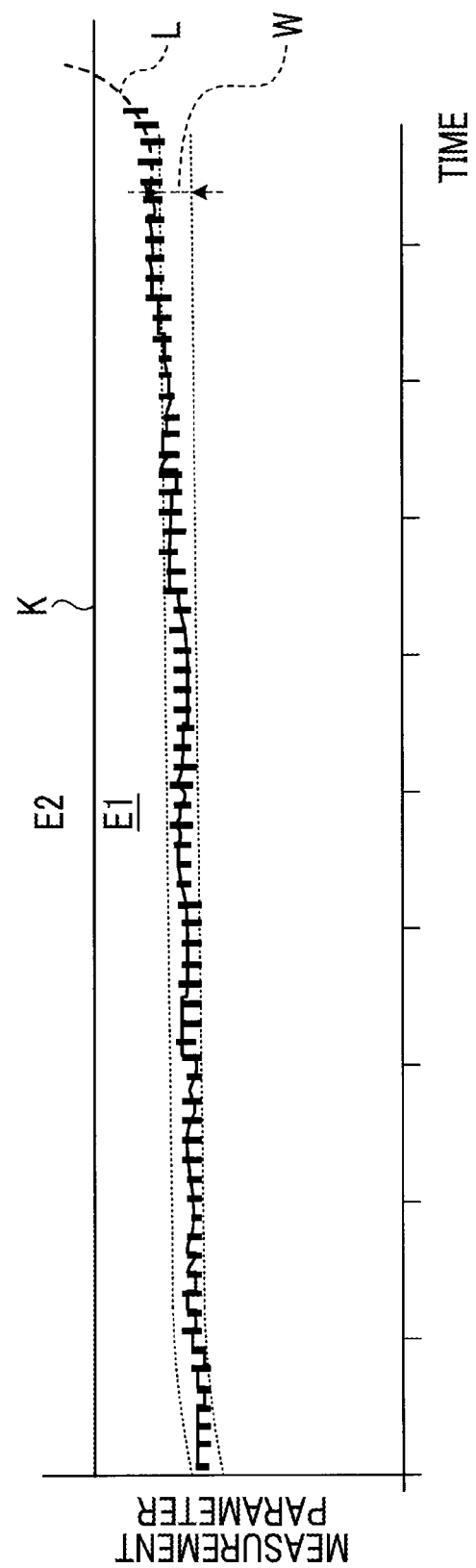
FIG. 2 is an explanatory diagram showing a measurement parameter.

Next, an abnormality diagnosis by the abnormality diagnosis system 103 will be described with reference to FIG. 2. The abnormality diagnosis system 103 is configured using hardware resources of a computer or the like, acquires the abnormality sign data which is output from the abnormality indication monitoring system 102, and performs a diagnosis of abnormality of the atomic power generation plant 110, based on the acquired abnormality sign data.

Here, the abnormality sign data which is output from the abnormality indication monitoring system 102 will be described with reference to FIG. 2. FIG. 2 is an explanatory diagram showing a measurement parameter. In FIG. 2, the vertical axis is the value of the measurement parameter and the horizontal axis is time. The abnormality indication monitoring system 102 sets a normal range W that is a range in which the plant operation data normally changes, based on the past plant operation data stored in the operation history database 105, as described above. Further, the abnormality indication monitoring system 102 determines whether or not the current plant operation data which is acquired in real time changes in the normal range W. Here, the measurement parameter is divided into a normality determination area E1 which is in a normal state and an abnormality determination area E2 which is in an abnormal state, by a warning value K as a threshold value for determining the presence or absence of abnormality, and the normal range W is set in the normality determination area E1. For this reason, the abnormality indication monitoring system 102 detects whether or not there is a sign of abnormality in the atomic power generation plant 110 although the atomic power generation plant 110 is not in an abnormal state.

In this manner, the measurement parameter in which a determination that there is an abnormality indication is made by the abnormality indication monitoring system 102 is a behavior before reaching the warning value K beyond the normal range W, and this measurement parameter is input to the abnormality diagnosis system 103 as the abnormality sign data.

The abnormality diagnosis system 103 compares the acquired abnormality sign data with the previously stored abnormality model pattern and specifies an abnormality cause by using a Bayesian network as a statistical model.

The abnormality model pattern is a pattern of the behavior of the measurement parameter which changes according to a cause of abnormality of the atomic power generation plant 110. A plurality of abnormality model patterns are provided according to various abnormality causes, and the abnormality cause and the probability of occurrence of the abnormality cause are associated with each of the abnormality model patterns. The abnormality model patterns corresponding to the measurement parameters will be described with reference to FIG. 3. FIG. 3 is an explanatory diagram showing the abnormality model patterns of the measurement parameters, and the abnormality causes corresponding to the abnormality model patterns. As shown in FIG. 3, for example, with regard to a measurement parameter A, two abnormality model patterns PA and PB are prepared. A plurality of abnormality causes CA1, CA2 are associated with the abnormality model pattern PA on one side, and a plurality of occurrence probabilities OA1, OA2 are respectively associated with the plurality of abnormality causes CA1, CA2. A plurality of abnormality causes CB1, CB2 are associated with the abnormality model pattern PB on the other side, and a plurality of occurrence probabilities OB1, OB2 are respectively associated with the plurality of abnormality causes CB1, CB2. The measurement parameter A in FIG. 3 is an example, and there are also a case where the abnormality model pattern is one and a case where the abnormality cause is one.

Figure 4:
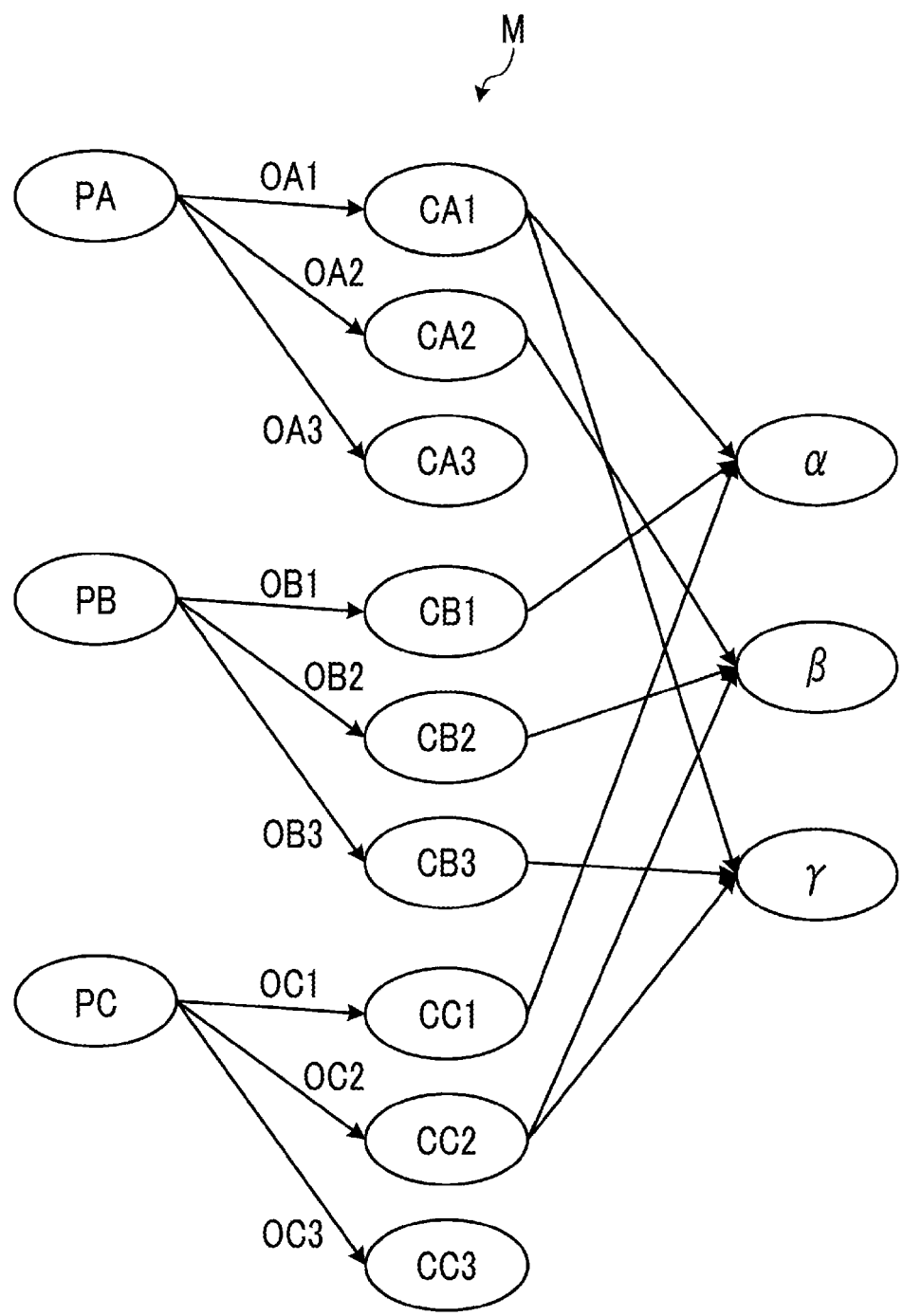
FIG. 4 is an explanatory diagram of a Bayesian network.

The Bayesian network is a statistical model which is constructed based on a plurality of abnormality model patterns corresponding to the abnormality causes, and the probabilities of occurrence of the abnormality causes which are associated with the plurality of abnormality model patterns. An example of the Bayesian network will be described with reference to FIG. 4. FIG. 4 is an explanatory diagram of the Bayesian network. A Bayesian network M is a model for deriving the abnormality cause and the probability of occurrence of the abnormality cause from a plurality of measurement parameters in a case where there are a plurality of measurement parameters in which a determination that there is an abnormality indication is made. As shown in FIGS. 3 and 4, the abnormality causes CA1 to CA3 are associated with the abnormality model pattern PA, and similarly, the abnormality causes CB1 to CB3 and CC1 to CC3 are also associated with the abnormality model patterns PB and PC. Further, as the abnormality causes, there are abnormality causes α, β, and γ, and the abnormality causes α, β, and γ are associated with the abnormality causes CA1 to CA3, CB1 to CB3, and CC1 to CC3. Specifically, the abnormality cause CA1, the abnormality cause CB1, and the abnormality cause CC1 are associated with the abnormality cause α, and the probability of occurrence of the abnormality cause α takes into account the presence or absence and the probabilities of occurrence of the abnormality cause CA1, the abnormality cause CB1, and the abnormality cause CC1. The abnormality cause β and the abnormality cause γ are also as shown in FIG. 4.

In a case of specifying the abnormality cause, the abnormality diagnosis system 103 first generates an abnormality sign pattern, based on the abnormality sign data. As described above, since the abnormality sign data is the measurement parameter which is a behavior before reaching the warning value K beyond the normal range W, the abnormality diagnosis system 103 generates a prediction model L (refer to FIG. 2) which predicts the progress of the measurement parameter by an extrapolation method, with respect to the measurement parameter. Further, the abnormality diagnosis system 103 generates a pattern of the behavior of the measurement parameter of the prediction model L as the abnormality sign pattern.

Further, the abnormality diagnosis system 103 specifies the cause of abnormality of the atomic power generation plant 110 by making a determination of the match between the generated abnormality sign pattern and the abnormality model pattern. Specifically, the abnormality diagnosis system 103 determines whether or not the abnormality sign pattern of a predetermined measurement parameter matches any one of a plurality of abnormality model patterns corresponding to the predetermined measurement parameter. Then, the abnormality diagnosis system 103 specifies the abnormality cause corresponding to the abnormality model pattern determined to match, as the abnormality cause of the abnormality sign pattern, specifies the occurrence probability corresponding to the specified abnormality cause, and outputs the specified results as diagnosis results. At this time, in a case where there are a plurality of abnormality causes corresponding to the abnormality model pattern, the abnormality diagnosis system 103 specifies a plurality of abnormality causes and an occurrence probability corresponding to each of the abnormality causes by using the Bayesian network shown in FIG. 4. Then, the abnormality diagnosis system 103 outputs the diagnosis results as the maintenance data to the maintenance database 135.

The maintenance system 104 outputs data relating to maintenance work which is associated with an abnormality cause from the maintenance terminal 136 to the maintenance mobile terminal 137 so as to perform maintenance and management of the specified abnormality cause by using the acquired maintenance data. In this way, the maintenance system 104 sends a work instruction to the maintenance worker and provides the maintenance worker with information on the abnormality cause. Further, the maintenance system 104 can provide the maintenance worker with instructions, procedures, work reports, or the like relating to the maintenance work. The maintenance worker carries the maintenance mobile terminal 137, executes the instructed maintenance work, and inputs information obtained by the maintenance work to the maintenance mobile terminal 137. As the information which is obtained by the maintenance work, for example, there are values of instruments which are provided in a device, and a state of the device, such as abnormal noise. The maintenance mobile terminal 137 inputs the input information to the maintenance database 135 through the maintenance terminal 136, as the maintenance data. Therefore, in addition to the diagnosis results of the abnormality diagnosis system 103, the information which is obtained by the maintenance work is also accumulated as the maintenance data in the maintenance database 135. Further, in the maintenance and management, the maintenance system 104 refers to the maintenance data that is the result of the abnormality diagnosis provided from the abnormality diagnosis system 103 and stored in the maintenance database 135.

As described above, according to this embodiment, it is possible to detect an abnormality indication of the atomic power generation plant 110, based on the plant operation data that is the operation history of the atomic power generation plant 110, perform a diagnosis of abnormality of the atomic power generation plant 110, based on the result of the detected abnormality indication, and promptly provide the result of the abnormality diagnosis to the maintenance system 104. For this reason, the maintenance system 104 can instruct the maintenance worker to perform the maintenance and management of the atomic power generation plant 110 based on the provided result of the abnormality diagnosis, or provide the maintenance worker with information on the abnormality diagnosis.

Further, according to this embodiment, it is possible to provide the maintenance worker who carries the maintenance mobile terminal 137 with the result of the abnormality diagnosis.

Further, according to this embodiment, since the maintenance terminal 136 and the maintenance mobile terminal 137 are used in the building 133 of the atomic power generation plant 110, it is possible to enhance the security concerning the communication between the maintenance terminal 136 and the maintenance mobile terminal 137.

REFERENCE SIGNS LIST

100: atomic power plant operation system
101: operation monitoring system
102: abnormality indication monitoring system
103: abnormality diagnosis system
104: maintenance system
105: operation history database
107: station bus
108a, 108b, 108c: unit bus
110: atomic power generation plant
115: site
121: distributed control system
122: process control system
123: gateway
124: gateway
131: central control room
132: office
133: building
134: conference room
135: maintenance database
136: maintenance terminal
137: maintenance mobile terminal
141: large information terminal
W: normal range K: warning value
E1: normality determination area
E2: abnormality determination area
M: Bayesian network

The invention claimed is:

1. A plant operation system configured to support operation of a plant, the system comprising:
   an operation monitoring system configured to acquire and monitor a plurality of measurement parameters which are output from a plurality of measuring instruments provided in the plant as plant operation data to control the operation of the plant based on the plant operation data;
   an operation history database configured to store the plant operation data;
   an abnormality indication monitoring system configured to monitor an indication of abnormality of the plant, based on history of the plant operation data stored in the operation history database;
   an abnormality diagnosis system configured to perform a diagnosis of abnormality of the plant, based on a result of the abnormality indication which is detected by the abnormality indication monitoring system to output a diagnosis result; and
   a maintenance system with a maintenance database which stores therein the diagnosis results from the abnormality diagnosis system as maintenance data for the plant configured to acquire the maintenance data from the maintenance data base to provide the acquired maintenance data to a maintenance worker of the plant and to store a maintenance inspection result obtained by inspection work by the maintenance worker in the maintenance database,
   wherein
   the operation monitoring system, the abnormality indication monitoring system, and the abnormality diagnosis system are connected via unit bus to one another so as to be able to communicate from the operation monitoring system to the abnormality indication monitoring system and the abnormality diagnosis system,
   the abnormality diagnosis system and the maintenance system are connected via unit bus to each other so as to be able to communicate with each other, and
   the abnormality diagnosis system is configured to compare an abnormality sign pattern generated by the current plant operation data with a plurality of abnormality model patterns of the past plant operation data stored in the operation history database, and when the abnormality sign pattern corresponds to one of the plurality of abnormality model patterns, configured to specify an occurrence probability corresponding to a cause of the specified abnormality as the diagnosis result and output the diagnosis result to the maintenance system, and when the abnormality sign pattern corresponds to some of the plurality of abnormality model patterns, configured to specify, using a Bayesian network as a statistical model, each of the occurrence probabilities corresponding to each of causes of the specified abnormalities as the diagnosis result and output the diagnosis result to the maintenance system.

2. The plant operation system according to claim 1, wherein the maintenance system has
   a maintenance terminal configured to acquire the result of the abnormality diagnosis from the abnormality diagnosis system, and
   a maintenance mobile terminal configured to perform wireless communication with the maintenance terminal, and
   the maintenance terminal is configured to provides the result of the abnormality diagnosis toward the maintenance mobile terminal.

3. The plant operation system according to claim 2, wherein the maintenance terminal and the maintenance mobile terminal are provided in a building in which the plant is installed.

4. A plant operation method for a plant operation system configured to support operation of a plant the plant operation system comprising;
   an operation monitoring system configured to control the operation of the plant;
   an operation history database configured to store the plant operation data;
   an abnormality indication monitoring system configured to monitor an indication of abnormality of the plant;
   an abnormality diagnosis system configured to perform a diagnosis of abnormality of the plant; and
   a maintenance system configured to store information for maintenance of the plant in a maintenance database and to provide the information to a maintenance worker of the plant; wherein
   the operation monitoring system, the abnormality indication monitoring system, and the abnormality diagnosis system are connected via unit bus to one another so as to be able to communicate from the operation monitoring system to the abnormality indication monitoring system and the abnormality diagnosis system and
   the abnormality diagnosis system and the maintenance system are connected via unit bus to each other so as to be able to communicate with each other; the method comprising;
   acquiring and monitoring, in the operation monitoring system, a plurality of measurement parameters which are output from a plurality of measuring instruments provided in the plant as plant operation data to control the operation of the plant based on the plant operation data;
   storing step, in the operation history database, the plant operation data;
   monitoring, in the abnormality indication monitoring system, an indication of abnormality of the plant, based on history of the plant operation data stored in the operation history database;
   performing, in the abnormality diagnosis system, a diagnosis of abnormality of the plant, based on a result of the abnormality indication which is detected by the abnormality indication monitoring system to output a diagnosis result; and
   acquiring, in the maintenance system, maintenance data from a maintenance database which stores therein the diagnosis results from the abnormality diagnosis system as the maintenance data for the plant, providing the acquired maintenance data to a maintenance worker of the plant and storing a maintenance inspection result obtained by inspection work by the maintenance worker in the maintenance database, characterized in that
   the method comprising;
   in performing the diagnosis of abnormality of the plant, comparing an abnormality sign pattern generated by the current plant operation data with a plurality of abnormality model patterns of the past plant operation data stored in the operation history database, and when the abnormality sign pattern corresponds to one of the plurality of abnormality model patterns, specifying an occurrence probability corresponding to a cause of the specified abnormality as the diagnosis result and outputting the diagnosis result to the maintenance system; and when the abnormality sign pattern corresponds to some of the plurality of abnormality model patterns, specifying, using a Bayesian network as a statistical model, each of the occurrence probabilities corresponding to each of causes of the specified abnormalities as the diagnosis result and outputting the diagnosis result to the maintenance system.

* * * * *